US012634686B2

(12) United States Patent
Parekh et al.

(10) Patent No.: US 12,634,686 B2
(45) Date of Patent: May 19, 2026

(54) DIAMETER MULTIFOLD MESSAGE

(71) Applicant: Parallel Wireless, Inc., Nashua, NH (US)

(72) Inventors: Manisha Sameer Gambhir Parekh, Pune (IN); Shivani Mehrotra, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/827,492

(22) Filed: Mar. 23, 2020

(65) Prior Publication Data

US 2020/0304996 A1     Sep. 24, 2020

Related U.S. Application Data

(60) Provisional application No. 62/822,647, filed on Mar. 22, 2019.

(51) Int. Cl.
H04W 12/06 (2021.01)

(52) U.S. Cl.
CPC .................................. H04W 12/06 (2013.01)

(58) Field of Classification Search
CPC ........ H04W 12/06; H04W 4/24; H04L 41/08; H04L 43/08; H04L 45/745; H04L 63/0892
See application file for complete search history.

(56) References Cited

U.S. PATENT DOCUMENTS

| | | | |
|---|---|---|---|
| 9,654,553 B2 | 5/2017 | Mann | |
| 2006/0171365 A1* | 8/2006 | Borella | H04W 8/02 370/338 |
| 2011/0173332 A1 | 7/2011 | Li | |
| 2013/0328429 A1* | 12/2013 | Enomoto | H02K 1/2793 310/114 |
| 2020/0204961 A1* | 6/2020 | Diwahar | H04W 84/18 |
| 2021/0051235 A1* | 2/2021 | Cai | H04M 15/66 |

OTHER PUBLICATIONS

Magnus Olsson, Shabnam Sultana, Catherine Mulligan, "Diameter Protocol", EPC and 4G Packet Networks Driving the Mobile Broadband Revolution Book • Second Edition • 2013.*
Cellusys, "Diameter Base Protocol:pocket-guide", Mar. 10, 2019.*
Ernon, "Diameter Extensible Authentication Protocol (EAP) Application", 2005 (Year: 2005).*
Diameter, "Diameter Protocol Explained" (Year: 2011).*

(Continued)

*Primary Examiner* — Messeret F Gebre
(74) *Attorney, Agent, or Firm* — Michael Y. Saji; Ashish Patel

(57) ABSTRACT

Systems, methods and computer software are disclosed for providing a Diameter multifold message. In one embodiment a method is disclosed, comprising: providing a multifold-command Attribute Value Pair (AVP), the multifold-command AVP including an AVP code, a set of VMP flags, an AVP length and a vendor ID; including the AVP in a Capabilities Exchange Request (CER) command for a Diameter stack supporting multiplexing of commands in one message; and using the AVP to combine messages from multiple applications running on a single Diameter node and multiple commands from a single application.

20 Claims, 7 Drawing Sheets

(56) References Cited

OTHER PUBLICATIONS

Jones "Diameter Group Signaling draft-ietf-dime-group-signaling-01.txt", further in view of (Year: 2013).*

Fajardo "Diameter Base Protocol draft-ietf-dime-rfc3588bis-34.txt". (Year: 2012).*

Hannes Tschofenig; Sebastien Decugis; Jean Mahoney; Jouni Korhonen, "Diameter End-to-End Communication," in Diameter: New Generation AAA Protocol—Design, Practice, and Applications , Wiley, 2019, pp. 61-80. (Year: 2019).*

A. Hussein, I. H. Elhajj, A. Chehab and A. Kayssi, "Securing Diameter: Comparing TLS, DTLS, and IPSec," 2016 IEEE International Multidisciplinary Conference on Engineering Technology (IMCET), Beirut, Lebanon, 2016, pp. 1-8. (Year: 2016).*

* cited by examiner

300

400

DIAMETER MULTIFOLD MESSAGE

CROSS-REFERENCE TO RELATED APPLICATIONS

This application claims priority under 35 U.S.C. § 119(e) to U.S. Provisional Pat. App. No. 62/822,647, filed Mar. 22, 2019, titled "Diameter Multifold Message" which is hereby incorporated by reference in its entirety for all purposes. This application also hereby incorporates by reference, for all purposes, each of the following U.S. patent application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Diameter is an authentication protocol that is useful for various different radio access technologies, potentially including 2G, 3G, 4G, 5G, Wi-Fi, and other radio access technologies.

Existing Diameter base protocol defined by RFC 6733 provides:

1. Delivery of AVPs (attribute value pairs).
2. Capabilities negotiation.
3. Error notification.

4. Extensibility, through addition of new commands and AVPs.
5. Basic services necessary for applications, such as handling of user sessions or accounting.

SUMMARY

Systems and methods for a Diameter multifold message. The inventors have contemplated the use of the described idea for all radio access technologies, In one embodiment, a method may be disclosed for providing a Diameter multifold message. The method may include providing a multifold-command Attribute Value Pair (AVP), the multifold-command AVP including an AVP code, a set of VMP flags, an AVP length and a vendor ID; including the AVP in a Capabilities Exchange Request (CER) command for a Diameter stack supporting multiplexing of commands in one message; and using the AVP to combine messages from multiple applications running on a single Diameter node and multiple commands from a single application.

In another embodiment, a non-transitory computer-readable medium containing instructions for providing a Diameter multifold message is disclosed. The instructions, when executed, cause a system to perform steps including providing a multifold-command Attribute Value Pair (AVP), the multifold-command AVP including an AVP code, a set of VMP flags, an AVP length and a vendor ID; including the AVP in a Capabilities Exchange Request (CER) command for a Diameter stack supporting multiplexing of commands in one message; and using the AVP to combine messages from multiple applications running on a single Diameter node and multiple commands from a single application.

In another embodiment, a system may be disclosed for providing a Diameter multifold message. The system may include a Diameter node; a peer node in communication with the Diameter node, wherein the Diameter node provides a multifold-command Attribute Value Pair (AVP), the multifold-command AVP including an AVP code, a set of VMP flags, an AVP length and a vendor ID; wherein the Diameter node includes the AVP in a Capabilities Exchange Request (CER) command for a Diameter stack supporting multiplexing of commands in one message; and wherein the Diameter node and the peer node use the AVP to combine messages from multiple applications running on a single Diameter node and multiple commands from a single application.

DETAILED DESCRIPTION

All data delivered by the protocol is in the form of an AVP. Some of these AVP values are used by the Diameter protocol itself, while others deliver data associated with applications that employ Diameter. AVPs may be added arbitrarily to Diameter messages, so long as the required AVPs are included and AVPs that are explicitly excluded are not included. AVPs are used by the base Diameter protocol to support the following features. The present disclosure is suitable for being used with any combination of the below features, with any combination of core network or radio access technology, including multi-operator core networks (MOCN) and multi-RAT cores or multi-RAT base stations, including any core network node supporting the Diameter protocol.

Transporting of user authentication information, for the purposes of enabling the Diameter server to authenticate the user. For example, it can be used by ePDG to authenticate a UE with AAA server, or any other server providing authentication.

Transporting of service specific authorization information, between client and servers, allowing the peers to decide whether a user's access request should be granted. For example, MME can check with EIR whether a UE is black listed or not.

Exchanging resource usage information, which MAY be used for accounting purposes, capacity planning, etc. For example, PCRF, OCS nodes, etc. talk to PGW for such purpose.

Relaying, proxying and redirecting of Diameter messages through a server hierarchy.

Figure 1:
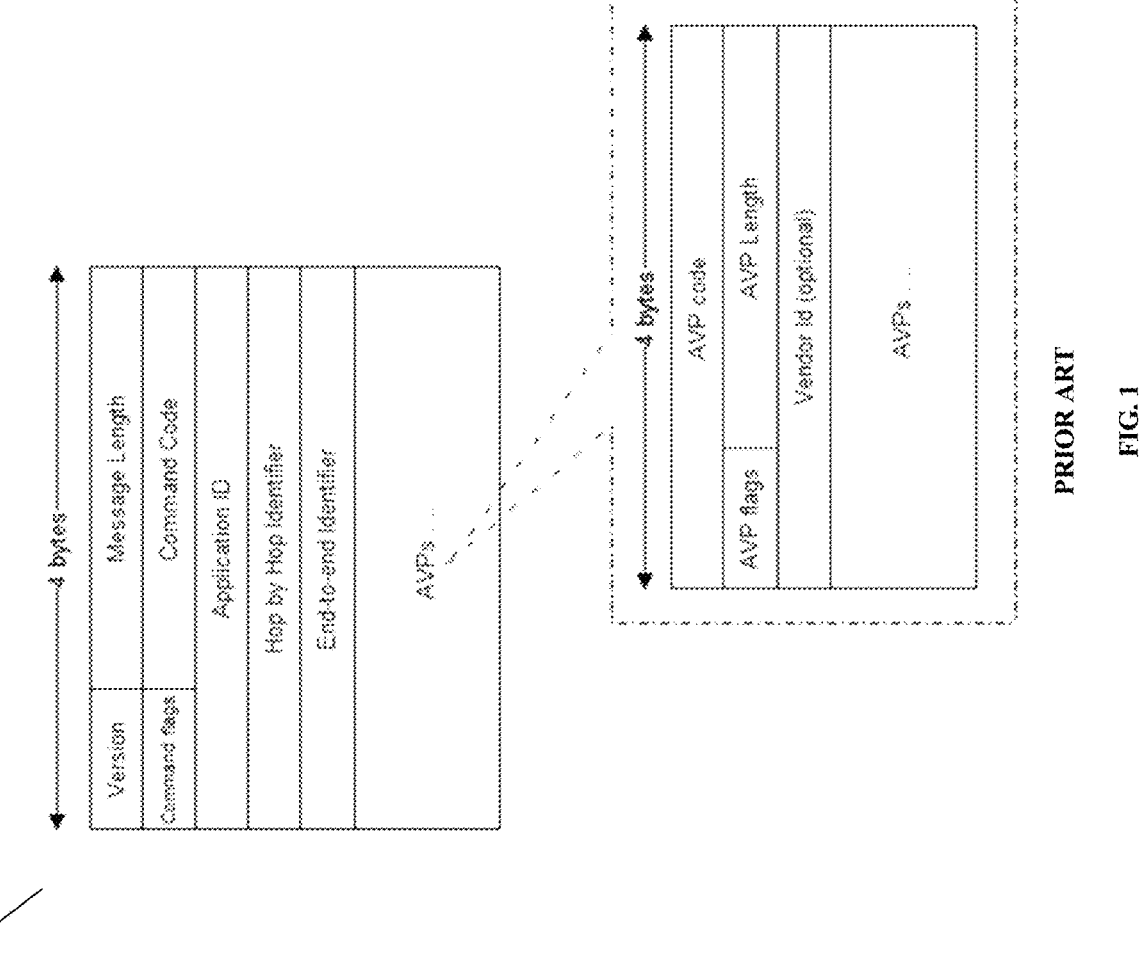
FIG. 1 is a diagram showing a Diameter header format, in accordance with some embodiments.

FIG. 1 shows a diagram 100 depicting a summary of Diameter header and the AVP structure. A Diameter command code helps individual services running on Diameter to exchange required information. Currently a Diameter message contains only one service specific or base Diameter message. Typically, multiple applications/services run on one Diameter stack. Core nodes such as PGW sends charging and policy related information to OCS and PCRF respectively, in Diameter messages on the network independent of each other, resulting in significant control plane signaling. Each Diameter message processing results in processing of L4, L3 and L2 protocols. Significant amount of processing cycles as well as resources are used in processing L2, L3 and L4 layers. If these cycles and resources are saved, it will increase efficiency of the system.

Figure 2:
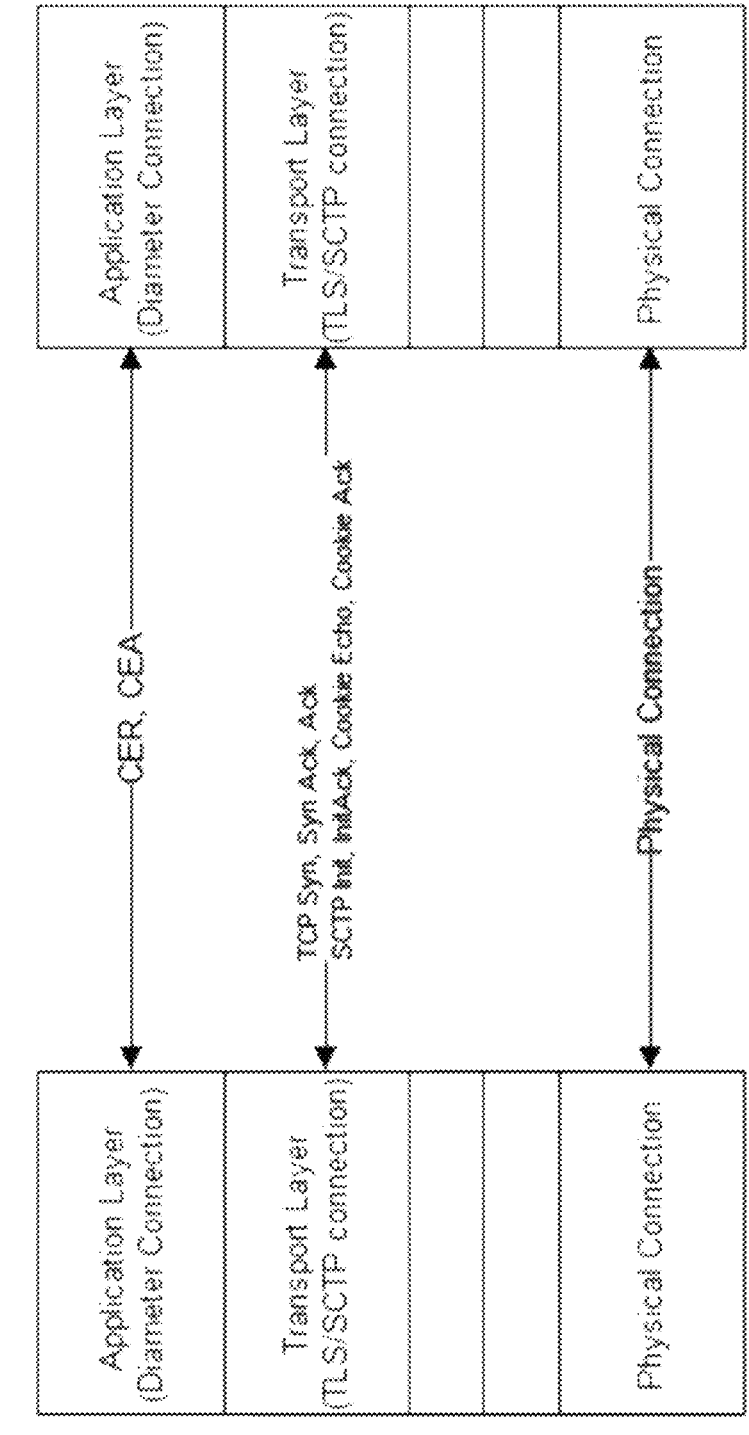
FIG. 2 is a diagram showing a Diameter connection establishment process, in accordance with some embodiments.

FIG. 2 shows a diagram 200 depicting the traditional Diameter protocol stack and connection establishment process.

The Diameter protocol is designed to be extensible, using several mechanisms, including:

Defining new AVPs

Creating new AVPs

Creating new commands

Creating new applications.

The present application extends the Diameter protocol by defining a new vendor specific AVP. To define a new Vendor specific AVP, IETF needs to approve a new RFC which describes the AVP value. The allocation of new AVP value is guided by IANA considerations of document that defines those AVPs.

Figure 3:
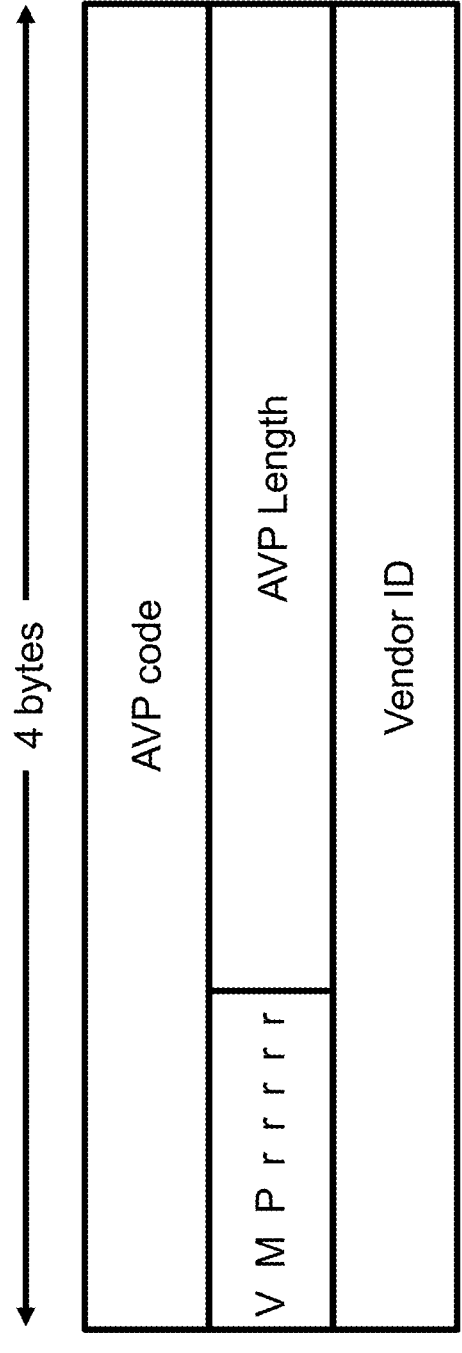
FIG. 3 is a diagram showing a Multifold Command AVP format, in accordance with some embodiments.

The new AVP 300 is defined in FIG. 3 as follows:

AVP Flags:

V bit, known as the Vendor-Specific bit, indicates whether the optional Vendor-ID field is present. 'M' Bit, known as the Mandatory bit, indicates whether support of the AVP is required. 'P' bit indicates the need for encrypt ion for end-to-end security. For Multifold-Command AVP, V bit MUST be set, M bit MUST not be set, P bit is optional. The Data Payload for Multifold . . . Command AVP is zero.

The Diameter stack which supports multiplexing of commands in one message should include this AVP in CER command. If peer supports this feature, it should include this AVP in CEA command. If peer does not include this AVP or sends it as Failed-AVP in CEA command, the originating Diameter stack does not use this feature and falls back to the default behavior.

If the peer Diameter stack supports this feature, the originating stack will include Multifold-Command AVP at the end of one Diameter message to indicate beginning of another message. This AVP can be used to combine messages from multiple applications running on one Diameter node as well as multiple messages (commands as well as Answer) from one application. The number of messages that can be pushed in a Diameter message depends on space available in the existing packet buffer (which is dependent on MTU of the path between the peers) and number of AVPs to be inserted in the next message.

This approach will save on L4, L3 and L2 processing for a set of Diameter messages thus eliminating most part of the stack processing for those messages. Batching of messages increases performance and makes optimal use of resources.

Figure 4:
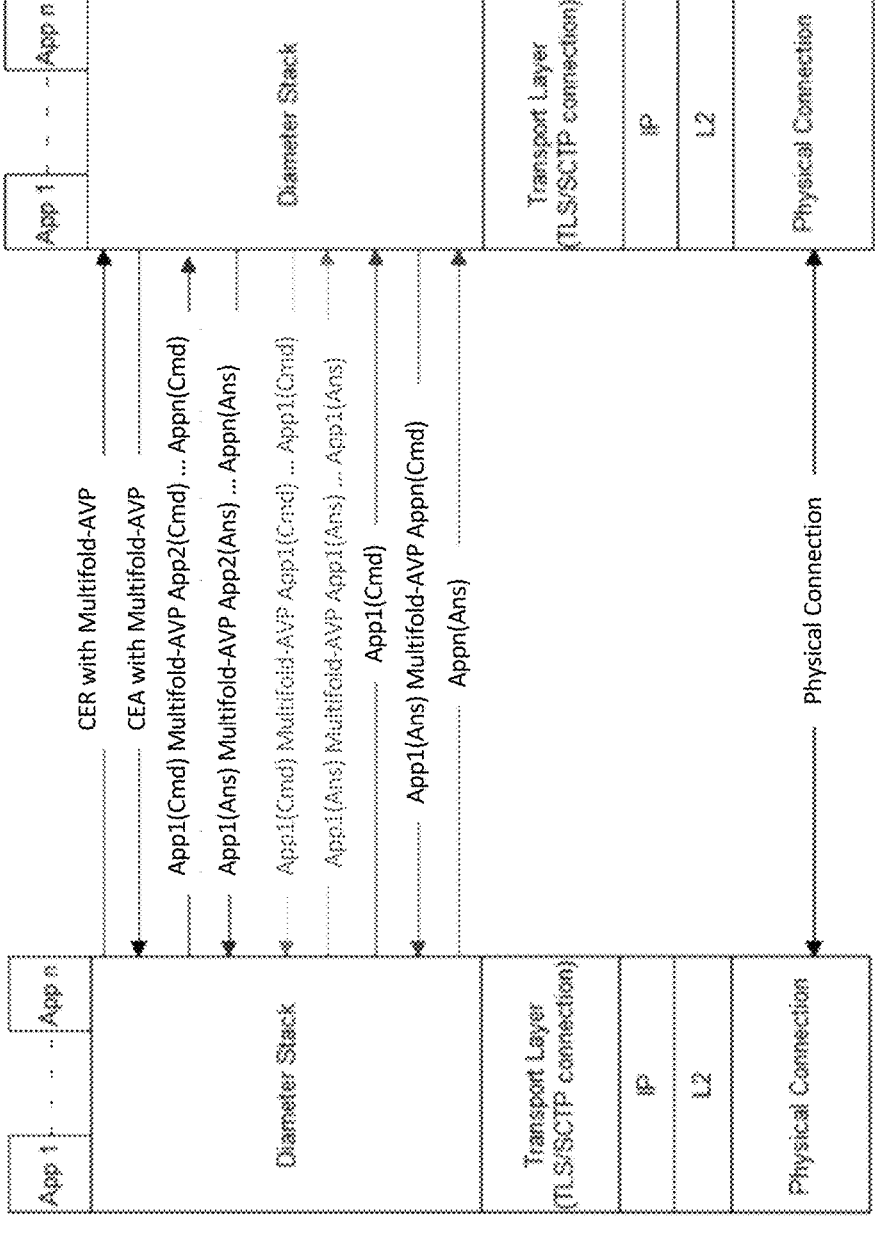
FIG. 4 is a diagram showing an architecture diagram, in accordance with some embodiments.

FIG. 4 shows the Diagram stack 400 and architecture.

Figure 5:
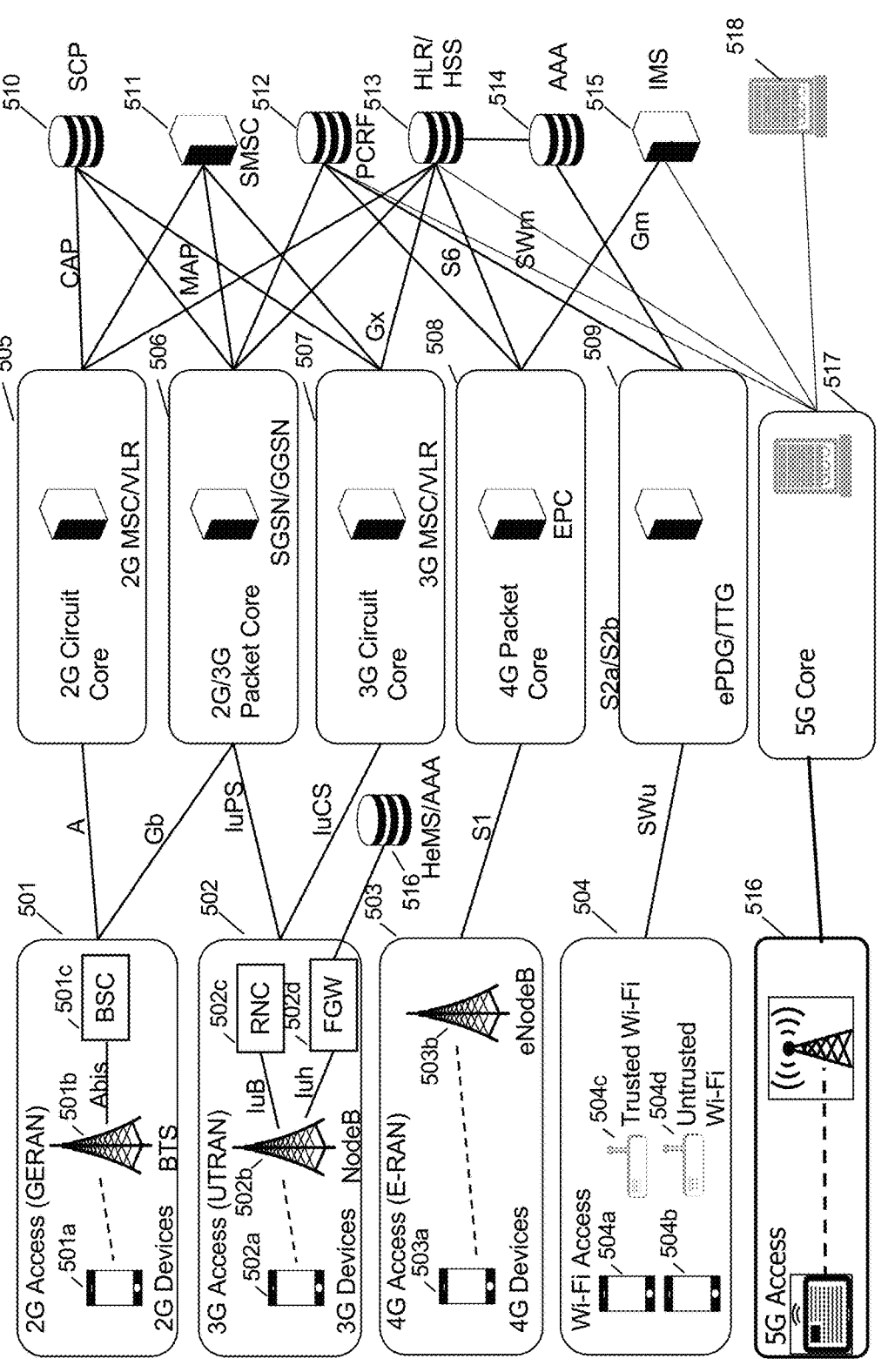
FIG. 5 is a schematic network architecture diagram for 3G and other-G prior art networks.

FIG. 5 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501b, while for the 3G UTRAN, an RNC 502c is required for Iub compatibility and an FGW 502*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 6:
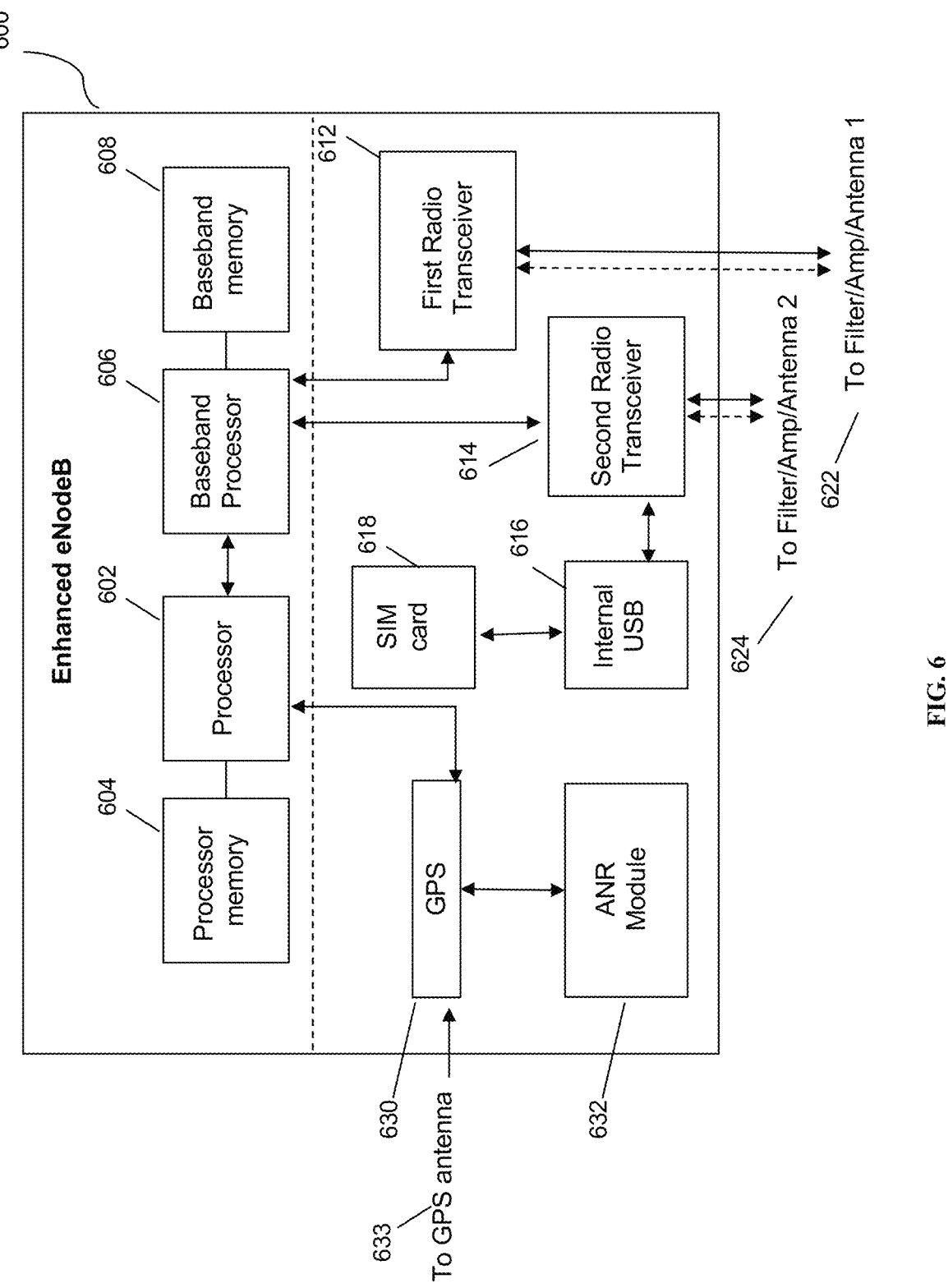
FIG. 6 is an enhanced eNodeB for performing the methods described herein, in accordance with some embodiments.

FIG. 6 is an enhanced eNodeB for performing the methods described herein, in accordance with some embodiments. Mesh network node 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
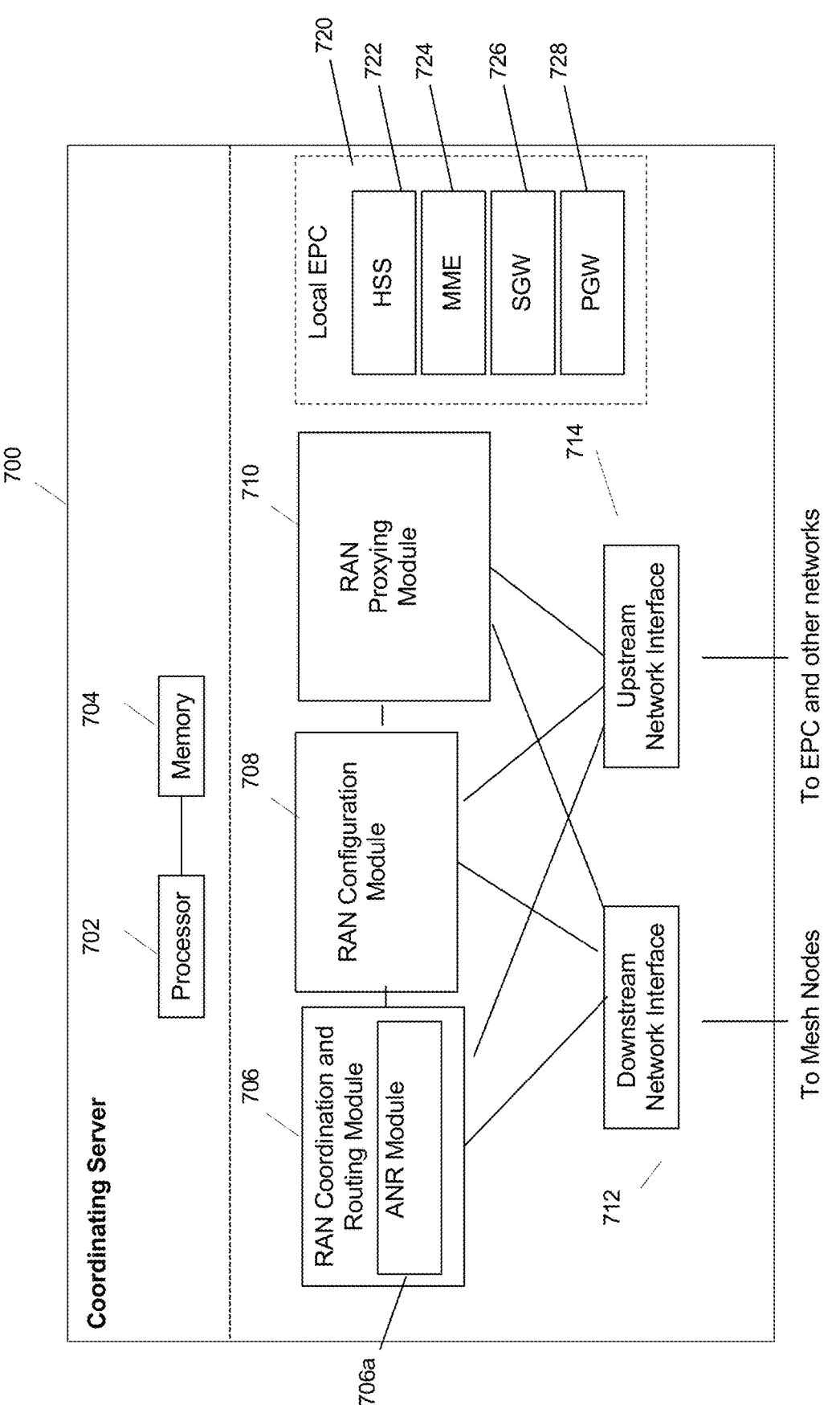
FIG. 7 is a coordinating server for providing services and performing methods as described herein, in accordance with some embodiments.

FIG. 7 is a coordinating server for providing services and performing methods as described herein, in accordance with some embodiments. Coordinating server 700 includes processor 702 and memory 704, which are configured to provide the functions described herein. Also present is radio access network coordination/routing (RAN Coordination and routing) module 706, including ANR module 706*a*, RAN configuration module 708, and RAN proxying module 710. The ANR module 706*a* may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing a Diameter multifold message, comprising:

providing a multifold-command Attribute Value Pair (AVP), the multifold-command AVP including an AVP code, a set of VMP flags, an AVP length and a vendor ID;

including the multifold-command AVP in a Capabilities Exchange Request (CER) command for a Diameter stack to determine support for multiplexing of commands in one message;

using the multifold-command AVP to combine multiple Diameter messages, from at least one of: multiple applications running on a first node supporting a Diameter protocol, and multiple commands from a single application, into a single Diameter multifold message communicated between the first node and a peer node supporting the Diameter protocol; and performing a check to ensure that a combined length of the multiple Diameter messages to be published in the single Diameter multifold message does not exceed space available in an existing packet buffer.

2. The method of claim 1 wherein:

the first node is a core network node or a RAN node; and the peer node is a core network node or a RAN node.

3. The method of claim 1 wherein the set of VMP flags includes a vendor-specific (V) bit indicating whether an optional vendor ID field is present.

4. The method of claim 3 wherein the set of VMP flags includes a mandatory (M) bit indicating whether support of the multifold-command AVP is required.

5. The method of claim 4 wherein the set of VMP flags includes a P bit indicating a need for encryption for end-to-end security.

6. The method of claim 5 wherein when providing a multifold-command AVP, the V bit is set, the M bit is not set, and the P bit may be set or not set.

7. The method of claim 1 further comprising when a peer node supports multiplexing commands, receiving from the peer node a Capabilities Exchange Answer (CEA) command including the multifold-command AVP.

8. The method of claim 1 further comprising batch processing the combined multiple Diameter messages.

9. A non-transitory computer-readable medium containing instructions for providing a Diameter multifold message which, when executed, cause a system to perform steps comprising:

providing a multifold-command Attribute Value Pair (AVP), the multifold-command AVP including an AVP code, a set of VMP flags, an AVP length and a vendor ID;

including the multi fold-command AVP in a Capabilities Exchange Request (CER) command for a Diameter stack to determine support for multiplexing of commands in one message;

using the multifold-command AVP to combine multiple Diameter messages, from at least one of: multiple applications running on a first node supporting a Diameter protocol and multiple commands from a single application, into a single Diameter multifold message communicated between the first node and a peer node supporting the Diameter protocol; and performing a check to ensure that a combined length of the multiple Diameter messages to be published in the single Diameter multifold message does not exceed space available in an existing packet buffer.

10. The computer-readable medium of claim 9 wherein:

the first node is a core network node or a radio access network (RAN) node; and the peer node is a core network node or a RAN node.

11. The computer-readable medium of claim 9 wherein the set of VMP flags includes a vendor-specific (V) bit indicating whether an optional vendor ID field is present.

12. The computer-readable medium of claim 11 wherein the set of VMP flags includes a mandatory (M) bit indicating whether support of the multifold-command AVP is required.

13. The computer-readable medium of claim 12 wherein the set of VMP flags includes a P bit indicating a need for encryption for end-to-end security.

14. The computer-readable medium of claim 13 wherein instructions for providing a multifold-command AVP includes instructions for providing the multifold-command AVP in which the V bit is set, the M bit is not set, and the P bit may be set or not set.

15. The computer-readable medium of claim 9 further comprising instructions, which when executed, cause the system to perform the step of, when a peer node supports multiplexing commands, receiving from the peer node a Capabilities Exchange Answer (CEA) command including the multifold-command AVP.

16. The computer-readable medium of claim 9 further comprising instructions, which when executed, cause the system to perform the step of batch processing the combined multiple Diameter messages.

17. A system for providing a Diameter multifold message, comprising:

a first core network or radio access network (RAN) node, including a processor coupled to a memory, and configured to couple to a second core network or RAN node;

wherein the first core network or RAN node provides a multifold-command Attribute Value Pair (AVP), the multifold-command AVP including an AVP code, a set of VMP flags, an AVP length and a vendor ID, the multifold-command AVP included in a Capabilities Exchange Request (CER) command for a Diameter stack to determine support for multiplexing of commands in one message;

wherein the first core network or RAN node and the second core network or RAN node use the determined multiplexing support to combine Diameter messages, from at least one of multiple applications running on the first core network or RAN node and multiple commands from a single application, into a single Diameter multifold message communicated between the first core network or RAN node and the second core network or RAN node; and wherein the first core network or RAN node performs a check to ensure that a combined length of the multiple Diameter messages to be published in the single Diameter multifold message does not exceed space available in an existing packet buffer.

18. The system of claim 17 wherein:

the first core network or RAN node is a core network node; and the second core network or RAN node is a RAN node.

19. The system of claim 17 wherein the set of VMP flags includes a vendor-specific (V) bit indicating whether an optional vendor ID field is present, a mandatory (M) bit indicating whether support of the multifold-command AVP is required, and a P bit indicating a need for encryption for end-to-end security, and wherein a multifold-command AVP is provided in which the V bit is set, the M bit is not set, and the P bit may be set or not set.

20. The system of claim 17 wherein the combined multiple Diameter messages are batch processed.

\* \* \* \* \*